Dec. 28, 1954      W. F. GOUDIE      2,697,904
CUTTER THROWOUT MECHANISM FOR POWER LAWN MOWERS
Filed Aug. 29, 1950
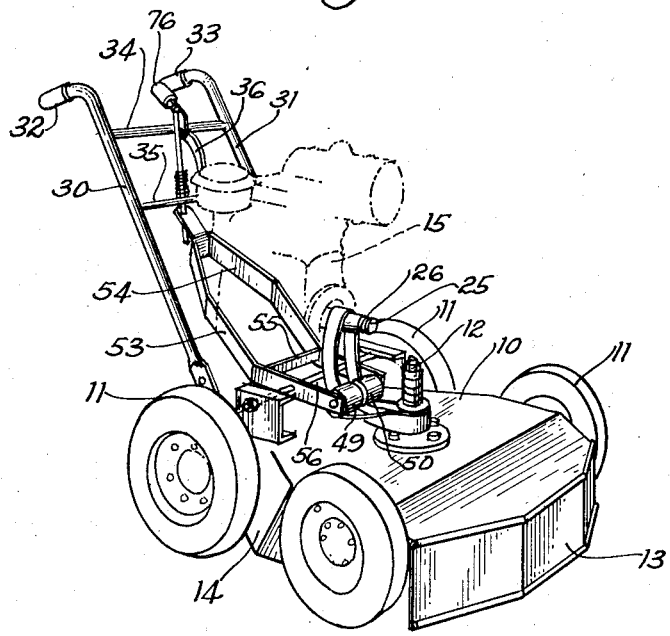
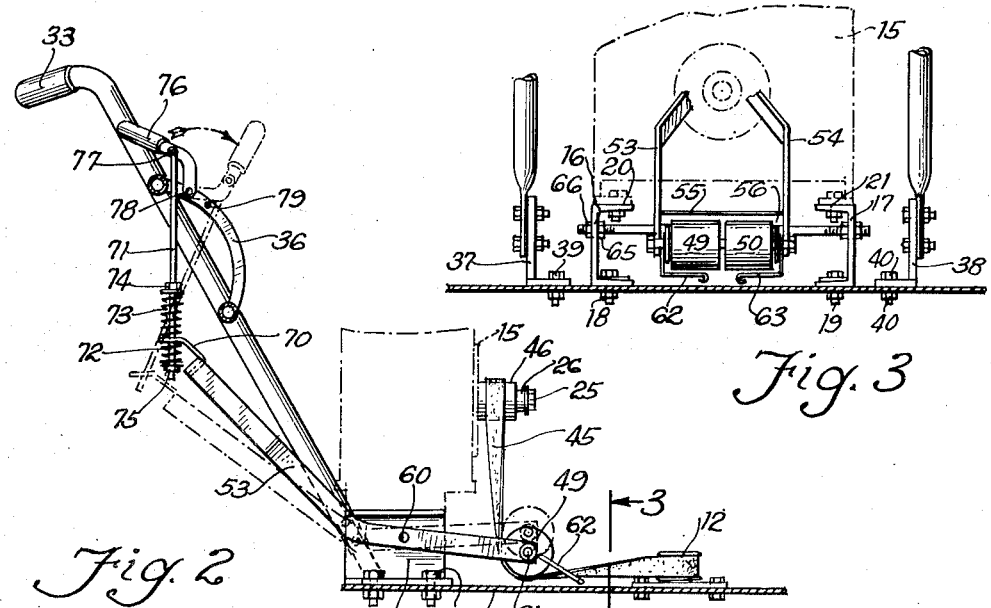
INVENTOR.
Wayne F. Goudie United States Patent Office 2,697,904
Patented Dec. 28, 1954

2,697,904

CUTTER THROWOUT MECHANISM FOR POWER LAWN MOWERS

Wayne F. Goudie, Kenosha, Wis., assignor to Devere Company, Racine, Wis., a corporation of Wisconsin Application August 29, 1950, Serial No. 182,148

2 Claims. (Cl. 56—25.4)

The present invention relates to a cutter throwout mechanism for a power lawn mower and more particularly to a cutter throwout mechanism suitable for use in a power lawn mower of the horizontal rotary cutter type, and the invention has for an object the provision of an improved cutter throwout mechanism adapted for use in a power lawn mower of this type, which is light in weight, efficient in operation, simple in arrangement and compact and rugged in construction.

It is another object of the present invention to provide a new and improved cutter throwout mechanism for a power lawn mower of the horizontal rotary cutter type which is extremely compact in arrangement and is substantially enclosed and protected by the other components of the mower.

It is still another object of the present invention to provide a new and improved cutter throwout mechanism for a power lawn mower of the horizontal rotary type in which a simplified linkage arrangement which is reliable in its operation is employed to control the application of power to the cutter.

It is a further object of the present invention to provide a new and improved cutter throwout mechanism for a power lawn mower of the horizontal rotary cutter type in which a simple and compact control linkage is provided to lock the throwout mechanism in a power applying position.

It is a still further object of the present invention to provide a new and improved cutter throwout mechanism for a power lawn mower of the horizontal rotary cutter type in which a simplified linkage arrangement provides increased mechanical advantage for controlling the application of power to the cutter.

The invention, both as to its organization and method of operation, together with further objects and advantages thereof, will best be understood by reference to the following specification taken in connection with the accompanying drawings, in which:

Fig. 1 is a perspective view of a power lawn mower of the horizontal rotary cutter type, employing the cutter throwout mechanism of the present invention;

Fig. 2 is a side elevational view partly in section of the cutter throwout mechanism of Fig. 1, and Fig. 3 is a fragmentary front elevational view of the mechanism of Fig. 2 taken along the lines 3—3 thereof.

Referring now more particularly to the drawing, the cutter throwout mechanism of the present invention is particularly adapted for use with a power driven lawn mower of the type shown in Fig. 1. Considered generally, this lawn mower comprises a horizontal platform 10 which is supported for movement on the wheels 11 and is provided with a centrally located, vertically extending shaft 12 which is journalled in the platform 10 and is provided at the hidden lower end thereof with a horizontal cutter blade (not shown) which is adapted to be rotated in a horizontal plane by rotation of the shaft 12. The platform 10 is provided with a front wall 13 and side walls 14 so as substantially to enclose the space surrounding the horizontal rotary cutter and thus define a confined air space open only to the ground.

A gasoline motor, indicated generally at 15 in Fig. 1, is provided for the dual purpose of propelling the wheel supported platform 10 and for rotating the enclosed horizontal cutter blade. The motor 15 is spaced above the platform 10 by means of a pair of opposed generally U-shaped motor support members 16 and 17 (Fig. 3) which are secured to the platform 10 by any suitable means such as the bolts 18 and 19. The support members 16 and 17 are provided with inwardly extending top flange portions 20 and 21 which form a seat for the base of the motor 15. To propel the lawn mower the horizontally extending drive shaft 25 of the motor 15 may be provided with a V-belt pulley 26 positioned on the end of the drive shaft 25 and a suitable V-belt driven gear reduction drive mechanism, not shown, may supply power to a sprocket on one of the rear wheels. For example, the reversible drive mechanism shown in the copending application of Albert Owen Hawkins, Serial No. 189,933, which was filed on Oct. 13, 1950, and which issued as Patent No. 2,634,629 on April 14, 1953, may be employed to supply power from the pulley 26 to a rear wheel of the mower. In order to guide the lawn mower and to support the mechanical linkages used to control the application of power to the components of the mower, there is provided a handle assembly including supporting rods 30 and 31 which extend upwardly away from the platform 10 at an angle thereto and are provided at the extremities thereof with the handle grips 32 and 33. A pair of crossbars 34 and 35 are secured to the upper portion of the rods 30 and 31 by any suitable means such as welding or the like to provide a rugged handle assembly and a transverse linkage support member 36 is positioned between the crossbars 34 and 35 substantially midway of the length thereof. The handle support rods 30 and 31 may be secured to the platform 10 by any suitable means such as the brackets 37 and 38 which are in turn secured to the platform by means of bolts 39 and 40.

In order to drive the cutter shaft 12 from the motor drive shaft 25 and to provide a throwout mechanism by means of which the rotary cutter blade may be disengaged from the motor without interfering with the forward motion of the mower, there is provided in accordance with the present invention the cutter throwout mechanism illustrated in detail in Fig. 2. As there shown, a flat belt 45 engages a pulley 46 on the horizontally extending motor drive shaft 25 and a pair of idler rollers 49 and 50 are employed to shift the belt 45 into engagement with the vertically extending cutter shaft 12. When the rollers 49 and 50 are moved away from the drive shafts 25 and 12 by a sufficient amount to tighten the belt 45, the drive shaft 12 is driven from the motor 15 in the desired direction.

In order to effect the above-described movement of the rollers 49 and 50, an arrangement is provided which is simple in arrangement and rugged in construction and which is at least partially protected and enclosed by the other elements of the mower. This arrangement comprises an idler carriage which supports the rollers 49 and 50 and includes the spaced side members 53 and 54 and the cross members 55 and 56. The idler carriage is supported on a transverse rod 60 which extends through apertures in the side arms 53 and 54 and is pivotally supported in the side walls of the motor support members 20 and 21. The idler rolls 49 and 50 are carried by the pin 61 which is positioned at the extremities of the arms 53 and 54, together with belt guide members 62 and 63 which are also carried by the pin 61 and hold the belt in engagement with the idler rolls 49 and 50.

In order to adjust the idler carriage sidewise so that the idler rollers 49 and 50 may be positioned in alignment with the paths of movement of the belt 45, the supporting rod 60 may be adjusted by means of the nuts 65 and 66 which are positioned on a threaded end portion of the pin 60 on either side of the motor support member 16.

The idler carriage support arms 53 and 54 extend inwardly at their rearward ends to form a generally U-shaped carriage with the rollers 49 and 50 carried at the extremities of the arms thereof. A tongue 70 is provided at the meeting ends of the arms 53 and 54 and a control rod 71 extends through a relatively large aperture provided therefor in the end tongue 70. A pair of coil springs 72 and 73 are positioned on the control rod 71 above and below the tongue 70 and may be adjusted by means of the nuts 74 and 75 to provide a resilient connection between the control rod 71 and the rear end of the idler carriage. The nuts 74 and 75 may also be adjusted to position the rear end of the idler carriage for correct tensioning of the belt 45 as will be described in more detail hereinafter. The upper end of the control rod 71 is pivotally connected to the intermediate portion of a cutter throwout lever 76 by means of the pin 77. The lever 76 is a substantially right angle lever and is pivotally connected by means of the pin 78 to an intermediate point along the control linkage support member 36. A stop pin 79 is provided on the support member 36 to limit the movement of the control lever 76.

Considering now the manner in which the above described cutter throwout mechanism functions to disengage the cutter shaft 12 from the motor 15, it will be evident from the foregoing discussion that when the idler carriage is in the position shown in full lines in Fig. 2, the idler rollers 49 and 50 maintain the belt 45 under tension so that the cutter drive shaft 12 is rotated. The position of the idler carriage may be varied when the control lever 76 is in the power applying position shown in full lines, by adjusting the nuts 74 and 75 so as to adjust the tension exerted on the belt 45 by the rollers 49 and 50. Also, the position of the rollers 49 and 50 may be initially adjusted laterally so as to position these rollers in alignment with the paths of movement of the belt sides by adjustment of the locking nuts 65 and 66. In the power applying position shown in full lines in Fig. 2, the control linkage, including the rod 71 and the lever 76, is locked in position due to the downward force exerted on the rod 71 when the belt 45 is tensioned, which force maintains the pivot point 77 over the center line of the pivot point 78 so that the linkage is firmly locked in position. By means of the above described over-center control linkage, the continued application of power to the rotary cutter is assured once the lever 76 is moved beyond the center line of the two pivot points 77 and 78.

When the cutter throwout lever 76 is pivoted forwardly about the pin 78 to the position shown in dotted lines in Fig. 2, the idler carriage is pivoted about the pin 60 and the rollers 49 and 50 are moved upwardly to the position shown in dotted lines wherein the tension on the belt 45 is released and the cutter shaft 12 is disengaged from the motor 15. In this connection it will be understood that the tongue 70 is provided with a sufficiently large aperture therein to permit the above described off-center movement of the control rod 71 although a resilient connection is maintained between these two members.

From the foregoing it is evident that the present invention provides a cutter throwout mechanism for a power lawn mower of the horizontal cutter type which is extremely simple in arrangement and economical to manufacture, and which is positioned within the unused space between the driving motor and the platform of the mower and is conveniently controlled by means of an over-center control linkage which is readily accessible for hand manipulation by the operator. Furthermore, a substantial mechanical advantage is obtained by pivoting the idler supporting carriage adjacent the roller supporting end thereof.

While there have been described what is at present considered to be the preferred embodiment of the invention, it will be understood that various modifications may be made therein which are within the true spirit and scope of the invention as defined in the appended claims.

What is claimed as new and is desired to be secured by Letters Patent of the United States is:

1. In a power mower, a wheel supported platform, cutting means including a cutter drive shaft journalled vertically in said platform and extending therethrough, a driving motor, means including a pair of spaced motor support members mounting said motor above and supported from said platform with the drive shaft thereof in a horizontal plane, a belt engaging both said drive shafts for driving said cutting means from said motor, an idler carriage pivotally mounted on said platform, a pair of idler rollers carried by said carriage at the forward end thereof and engaging said belt, a control mechanism connected at one end to the rear end of said carriage and extending upwardly therefrom, and means including an over-center control linkage connected to the other end of said control mechanism and supported on the handle of the mower for pivoting said carriage to move said idler rollers in the direction to tighten said belt.

2. The structure defined by claim 1 and including an adjustable resilient connection between said control mechanism and the rear end of said carriage in order to adjust the tension on said belt.

References Cited in the file of this patent

UNITED STATES PATENTS

| Number | Name | Date |
|---|---|---|
| 932,000 | Cressman | Aug. 24, 1909 |
| 1,978,526 | Eppler | Oct. 30, 1934 |
| 2,017,524 | Bolens | Oct. 15, 1935 |
| 2,232,671 | Loder | Feb. 18, 1941 |

FOREIGN PATENTS

| Number | Country | Date |
|---|---|---|
| 370,191 | Germany | Feb. 28, 1923 |